(12) United States Patent
Ito

(10) Patent No.: US 12,359,879 B2
(45) Date of Patent: Jul. 15, 2025

(54) LIQUID HYDROGEN VAPORIZER

(71) Applicant: TOYOTA JIDOSHA KABUSHIKI KAISHA, Aichi-ken (JP)

(72) Inventor: Naoaki Ito, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 196 days.

(21) Appl. No.: 18/325,119

(22) Filed: May 30, 2023

(65) Prior Publication Data

US 2024/0006629 A1    Jan. 4, 2024

(30) Foreign Application Priority Data

Jun. 30, 2022    (JP) ................ 2022-105882

(51) Int. Cl.
| F28D 7/08 | (2006.01) |
| F28F 1/30 | (2006.01) |
| F28D 7/00 | (2006.01) |
| F28D 21/00 | (2006.01) |

(52) U.S. Cl.
CPC ........... F28F 1/30 (2013.01); F28D 7/082 (2013.01); *F28D 7/0075* (2013.01); *F28D 2021/0033* (2013.01); *F28D 2021/0064* (2013.01)

(58) Field of Classification Search
CPC ......... F28F 2265/26; F28D 7/085; F17C 9/02
See application file for complete search history.

(56) References Cited

U.S. PATENT DOCUMENTS

| 4,487,256 A * | 12/1984 | Lutjens ............... F28F 1/20 62/50.7 |
| 5,174,371 A * | 12/1992 | Grillo ................. F28F 1/22 165/171 |
| 2004/0261395 A1 * | 12/2004 | Engdahl ............. F02C 7/143 60/722 |
| 2006/0169446 A1 * | 8/2006 | Chien ................. F28F 1/32 165/163 |

(Continued)

FOREIGN PATENT DOCUMENTS

| CN | 102022931 A * | 4/2011 |
| JP | 2015-158225 A | 9/2015 |
| JP | 2021-021433 A | 2/2021 |

OTHER PUBLICATIONS

Akio Toyoda, Certificate A for the Application of Exception to Lack of Novelty of Invention, dated Jun. 30, 2022, Toyota Motor Corporation, The images in the certificate are captured from https://www.youtube.com/watch?v=mB6-bOjFg94, 7pp.

(Continued)

*Primary Examiner* — Eric S Ruppert
(74) *Attorney, Agent, or Firm* — HAUPTMAN HAM, LLP

(57) ABSTRACT

A liquid hydrogen vaporizer for performing heat exchange between liquid hydrogen and helium gas and vaporizing liquid hydrogen, comprising: a lower first column tube which is a fin tube composed of a tube through which liquid hydrogen flows and a fin assembly attached to an outer periphery of the tube; and a lower casing through which helium gas flows outside the lower first column tube, wherein the fin assembly is composed of a sleeve covered on an outer surface of the tube and a plurality of fins attached to an outer peripheral surface of the sleeve, and the sleeve is slidable in a longitudinal direction of the tube.

4 Claims, 6 Drawing Sheets

(56) References Cited

U.S. PATENT DOCUMENTS

| | | | | |
|---|---|---|---|---|
| 2006/0231242 A1* | 10/2006 | Hawranek | ............. | F28D 1/0233 |
| | | | | 165/157 |
| 2008/0314051 A1* | 12/2008 | McKee | .................... | F28F 1/14 |
| | | | | 62/51.1 |
| 2010/0116466 A1* | 5/2010 | Hawranek | ............. | F28D 1/0233 |
| | | | | 165/104.19 |

OTHER PUBLICATIONS

Akio Toyoda, Certificate B for the Application of Exception to Lack of Novelty of Invention, dated Jun. 30, 2022, Toyota Motor Corporation, The images in the certificate are captured from https://www.youtube.com/watch?v=Wsx1HM671Ac, 7pp.

* cited by examiner

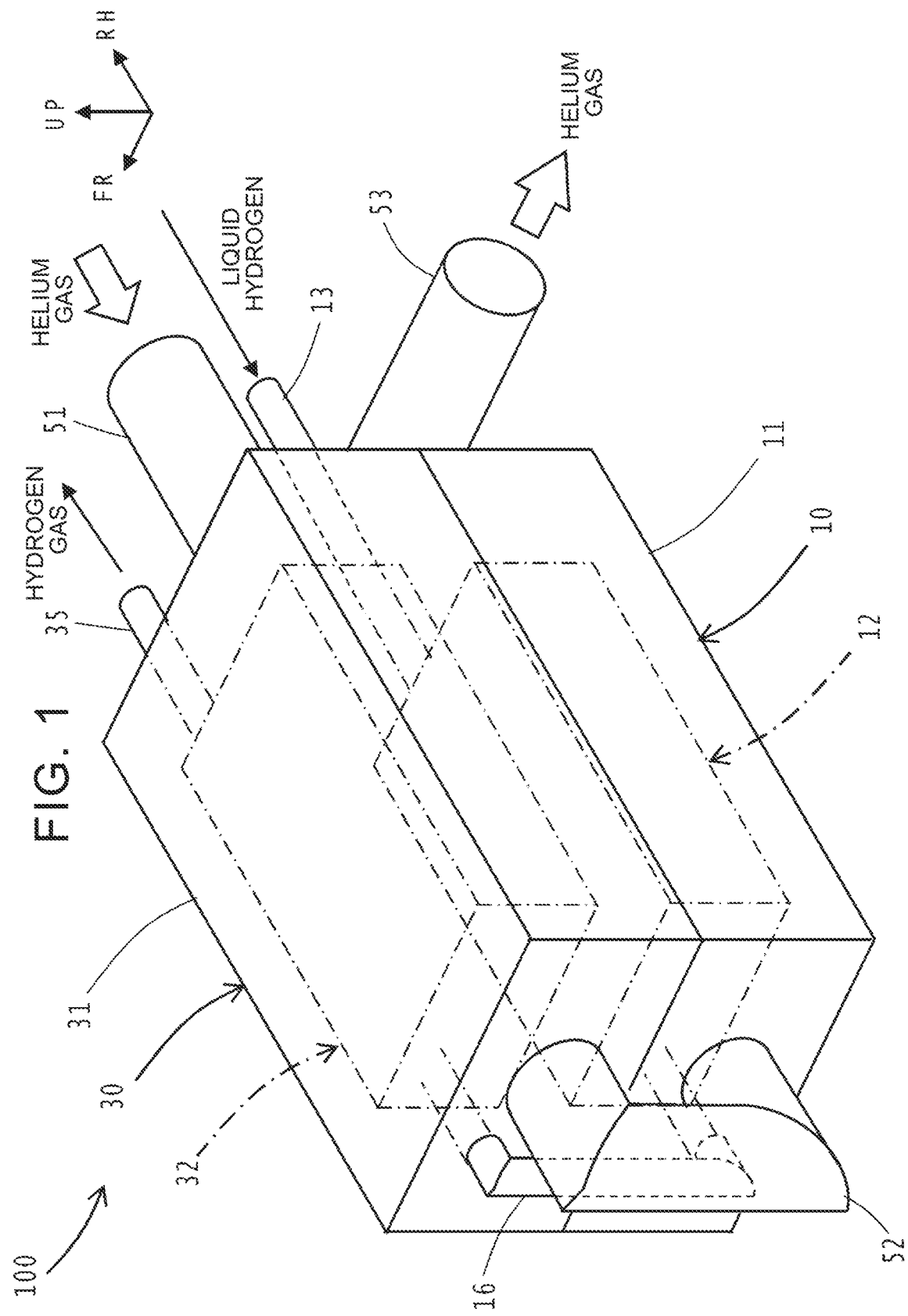

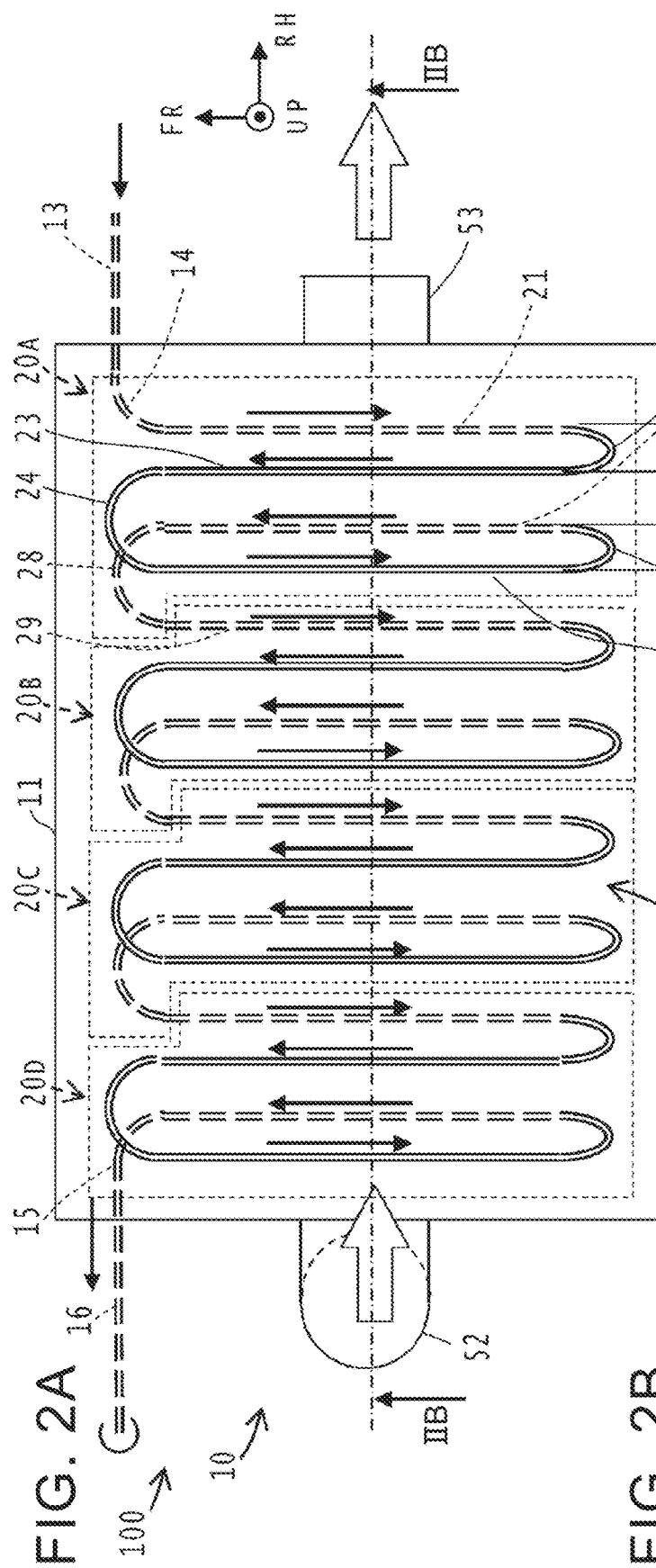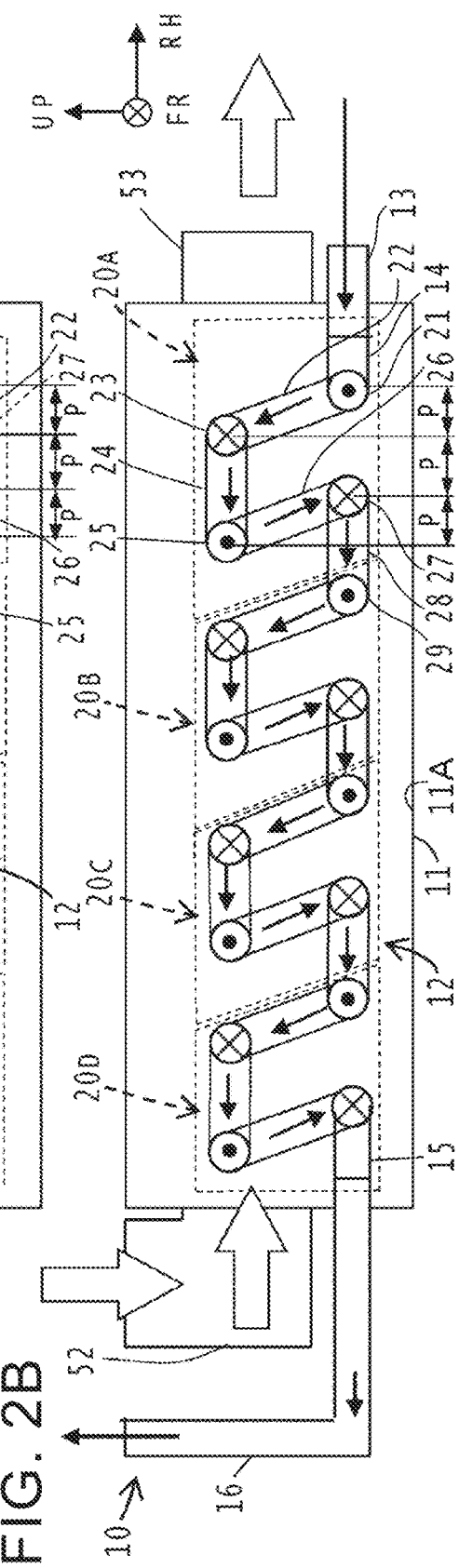

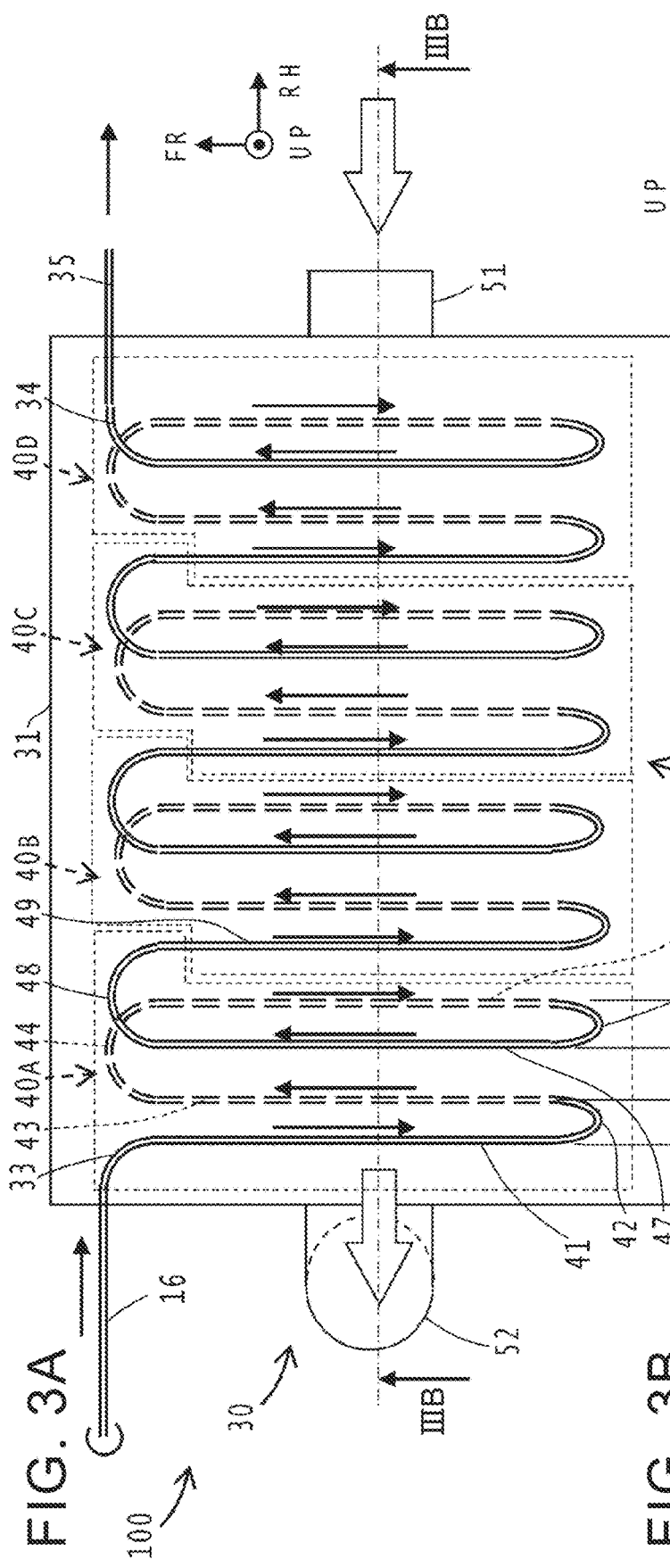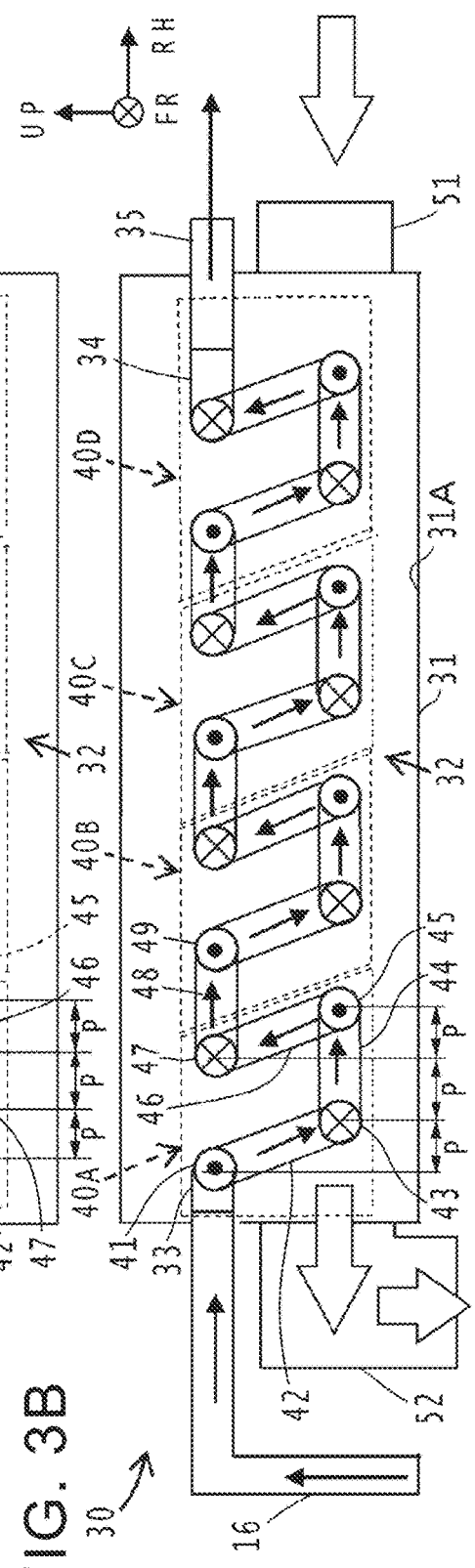

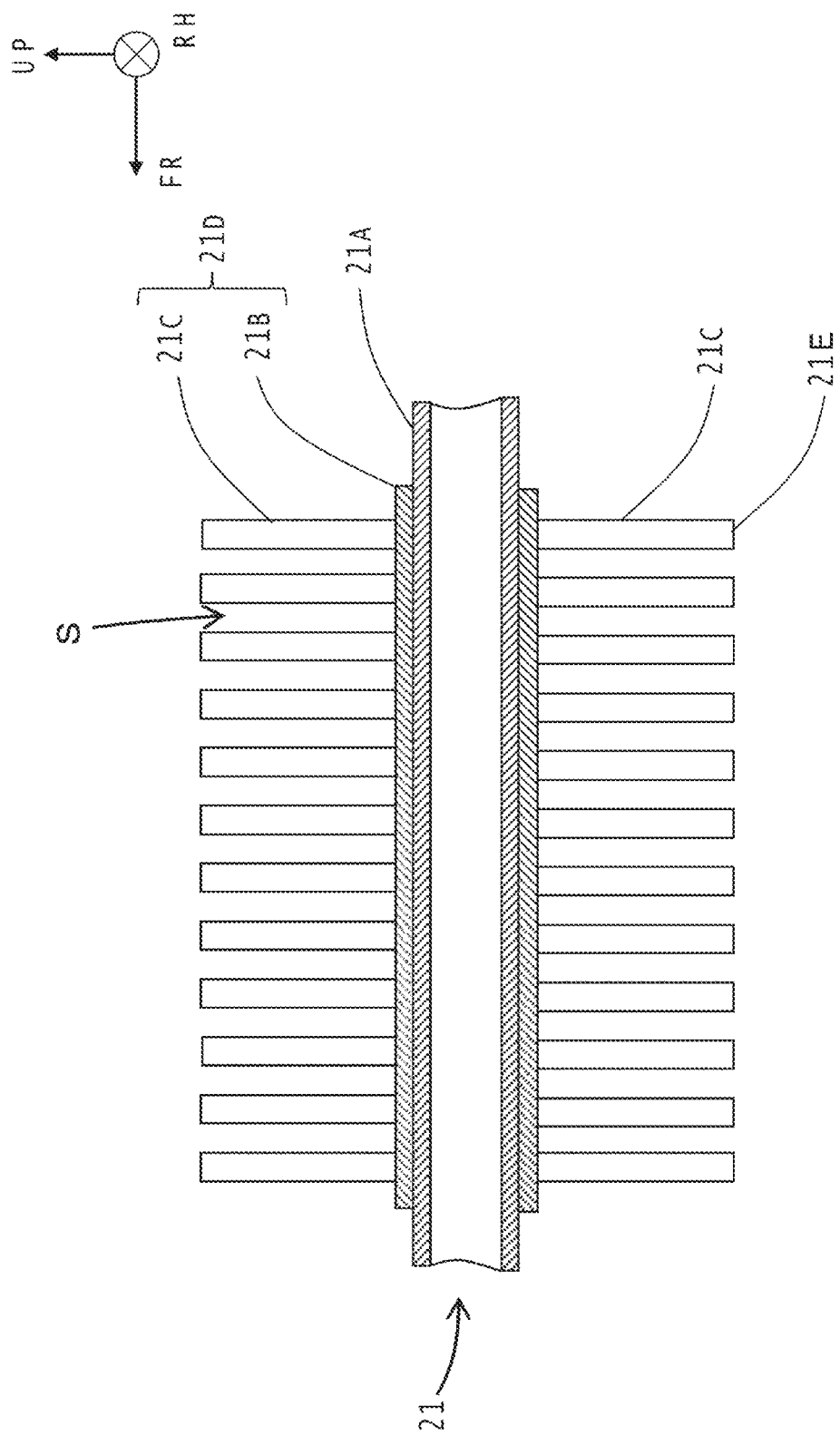

LIQUID HYDROGEN VAPORIZER

CROSS-REFERENCE TO RELATED APPLICATION

This application claims priority to Japanese Patent Application No. 2022-105882 filed on Jun. 30, 2022, incorporated herein by reference in its entirety.

BACKGROUND

1. Technical Field

The present disclosure relates to a structure of a liquid hydrogen vaporizer that vaporizes liquid hydrogen.

2. Description of Related Art

Japanese Unexamined Patent Application Publication No. 2021-21433 (JP 2021-21433 A) discloses a vaporizer for vaporizing liquid hydrogen by heat exchange between liquid hydrogen and helium gas. Japanese Unexamined Patent Application Publication No. 2015-158225 (JP 2015-158225 A) discloses a liquid hydrogen vaporization system provided with a vaporizer for vaporizing liquid hydrogen and a circulation channel for circulating a low-temperature helium gas flowing out of the vaporizer to the vaporizer. In this liquid hydrogen vaporization system, cold heat generated during the vaporization of the liquid hydrogen is recovered.

SUMMARY

In recent years, fuel cell electric vehicles and hydrogen engine vehicles using hydrogen gas have been put into practical use. These vehicles are equipped with a hydrogen gas tank, and supply hydrogen gas filled in the hydrogen gas tank to a fuel cell or a hydrogen engine. These vehicles are required to have a longer cruising distance. In order to increase the cruising distance, a liquid hydrogen tank is mounted on a vehicle, and hydrogen gas is generated by vaporizing liquid hydrogen in the vehicle, and the generated hydrogen gas is supplied to a fuel cell or a hydrogen engine. However, the vaporizers described in JP 2021-21433 A and JP 2015-158225 A are large and are difficult to be mounted on vehicles.

Therefore, an object of the present disclosure is to make a liquid hydrogen vaporizer compact to the extent that a vaporizer can be mounted on a vehicle.

A liquid hydrogen vaporizer according to the present disclosure is a liquid hydrogen vaporizer that performs heat exchange between liquid hydrogen and a heating medium and that vaporizes liquid hydrogen, the liquid hydrogen vaporizer including:
- a fin tube that is configured of a tube through which liquid hydrogen flows and a fin assembly that is attached to an outer periphery of the tube; and
- a casing through which a heating medium flows on an outer side of the fin tube accommodated inside the casing;
- the fin assembly is configured of
- a sleeve mounted on the outer surface of the tube, and
- a plurality of fins attached to an outer peripheral surface of the sleeve, and
- in which the sleeve is slidable in a longitudinal direction of the tube.

As described above, since the sleeve slides with respect to the tube, it is possible to absorb a difference in thermal expansion between the sleeve and the tube and suppress a thermal stress generated in the tube or the sleeve. Accordingly, even when there is a temperature difference between the tube through which the cryogenic liquid hydrogen flows and the sleeve or the fin in contact with the heating medium, a heat transfer area can be increased by the fin, and the liquid hydrogen vaporizer can be made compact to such a degree that the liquid hydrogen vaporizer can be mounted on the vehicle.

In a liquid hydrogen vaporizer according to the present disclosure, the sleeve and the fin may be made of a different material than the tube.

Accordingly, for example, the heat exchange efficiency can be improved by configuring the tube that is in contact with the liquid hydrogen of hydrogen-resistant stainless steel or the like, and by configuring the sleeve and the fin of aluminum or the like having a higher thermal conductivity than stainless steel. This makes it possible to make the liquid hydrogen vaporizer more compact.

In a liquid hydrogen vaporizer according to the present disclosure, in the fin tube, a tip of the fin may be in contact with an inner surface of the casing, and the fin tube may be supported by the fin from the inner surface of the casing.

As a result, since the cryogenic tube is not directly supported, the supporting configuration of the fin tube can be simplified, and the liquid hydrogen vaporizer can be made compact.

In a liquid hydrogen vaporizer according to the present disclosure,
- the tube may be configured of a single folded flow path in which an upper folded portion, a first lateral folded portion, a lower folded portion, and a second lateral folded portion are repeated in order with a straight pipe portion interposed between the upper folded portion, the first lateral folded portion, the lower folded portion, and the second lateral folded portion, the fin assembly may be provided in the straight pipe portion,
- each of the fins may be a plurality of strip-shaped plates in which a longitudinal direction extends in a radial direction from the outer peripheral surface of the sleeve, and each of the fins is attached to the sleeve such that a width direction is an extending direction of the sleeve, and
- the plurality of fins may be arranged in a line with a gap along an extending direction of the sleeve.

As a result, the fins can be densely arranged, and the liquid hydrogen vaporizer can be made compact. In addition, since the tube is configured by a single folded flow path, there is no need to provide a header, and thus the liquid hydrogen vaporizer can be made compact.

In a liquid hydrogen vaporizer according to the present disclosure, the heating medium may be helium gas.

Since the helium gas maintains a gas state without freezing even when it comes into contact with the outer surface of the tube close to the temperature of the liquid hydrogen, it is possible to suppress the performance of the liquid hydrogen vaporizer from deteriorating due to moisture on the surface of the tube freezing as in the case where air or the like is used as the heating medium.

The present disclosure can be made compact to the extent that a liquid hydrogen vaporizer can be mounted on a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a perspective view of the liquid hydrogen vaporizer of an embodiment

FIG. 2A is a plan view illustrating a tubing arrangement of the lower heat exchanger of the liquid hydrogen vaporizer shown in FIG. 1;

FIG. 2B is a sectional elevation view illustrating a tubing arrangement of the lower heat exchanger of the liquid hydrogen vaporizer shown in FIG. 1;

FIG. 3A is a plan view illustrating a tubing arrangement of the heat exchanger on the liquid hydrogen vaporizer shown in FIG. 1;

FIG. 3B is a sectional elevation view showing a tubing arrangement of the upper heat exchanger of the liquid hydrogen vaporizer of FIG. 1;

FIG. 4 is a longitudinal cross-sectional view of a fin tube;

DETAILED DESCRIPTION OF EMBODIMENTS

Figure 5:
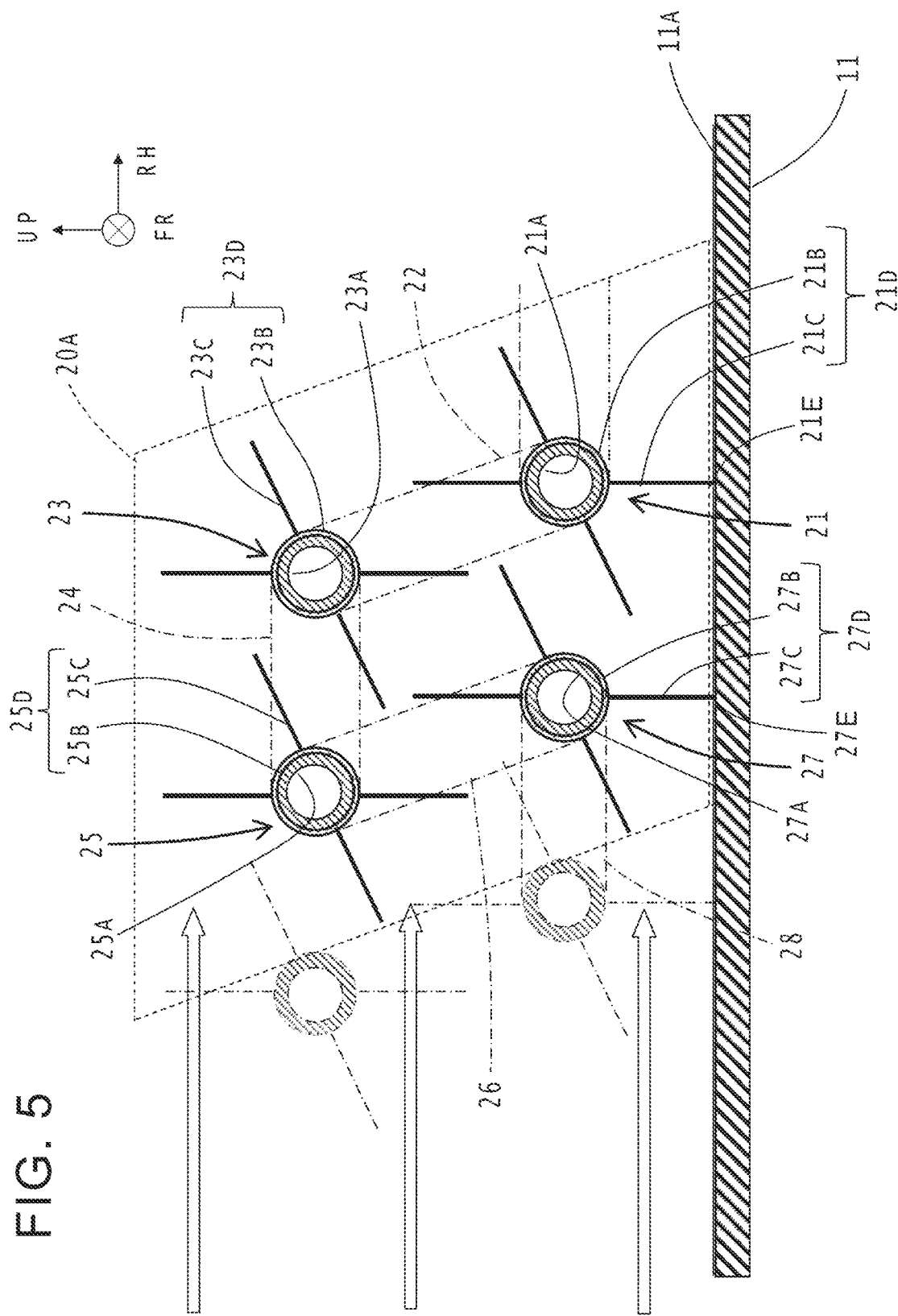
FIG. 5 is a radial cross-sectional view of a fin tube.

Hereinafter, a liquid hydrogen vaporizer 100 according to an embodiment will be described with reference to the drawings. The arrows FR, the arrows UP, and the arrows RH shown in the drawings indicate the front side, the upper side, and the right side of the liquid hydrogen vaporizer 100, respectively. In addition, the opposite directions of the arrow FR, UP, RH indicate the rear side, the lower side, and the left side. Hereinafter, when simply describing using the front-rear, left-right, and up-down directions, unless otherwise specified, it is assumed that the front-rear, left-right, and up-down directions of the liquid hydrogen vaporizer 100 in the front-rear direction, the left-right direction, and the up-down direction are indicated. Further, the liquid hydrogen vaporizer 100 is mounted on the vehicle such that the front side is the vehicle front side (traveling direction), the upper side is the vehicle upper side, and the right side is the vehicle right side. Therefore, when the liquid hydrogen vaporizer 100 is mounted on the vehicle, the front side, the upper side, and the right side of the liquid hydrogen vaporizer 100 are the front side, the upper side, and the right side of the vehicle.

As shown in FIG. 1, the liquid hydrogen vaporizer 100 includes a lower heat exchanger 10 and an upper heat exchanger 30. The lower heat exchanger 10 includes a lower pipe group 12 and a rectangular box-shaped lower casing 11 that houses the lower pipe group 12 therein. The upper heat exchanger 30 includes an upper pipe group 32 and a rectangular box-shaped upper casing 31 that houses the upper pipe group 32. A liquid hydrogen inlet pipe 13 into which liquid hydrogen flows is connected to the right side of the lower pipe group 12. Further, the lower end of the pipe group connecting pipe 16 for connecting the lower pipe group 12 and the upper pipe group 32 is connected to the left side of the lower pipe group 12. The pipe group connecting pipe 16 extends in the vertical direction, and the upper end thereof is connected to the left side of the upper pipe group 32. A hydrogen gas outlet pipe 35 through which the vaporized hydrogen gas flows is connected to the right side of the upper pipe group 32.

A helium gas inlet duct 51 into which helium gas as a heating medium flows is connected to the right side of the upper casing 31. An upper end of a helium gas connection duct 52 that connects the upper casing 31 and the lower casing 11 is connected to the left side of the upper casing 31. The lower end of the helium gas connection duct 52 is connected to the left side of the lower casing 11. A helium gas outlet duct 53 through which the heat-exchanged helium gas flows is connected to the right side of the lower casing 11.

The liquid hydrogen flowing from the liquid hydrogen inlet pipe 13 to the right side of the lower pipe group 12 flows to the left in the lower pipe group 12, and flows out to the pipe group connecting pipe 16 as a two-layer flow of the liquid hydrogen and the hydrogen gas. The liquid hydrogen and the hydrogen gas flow into the left side of the upper pipe group 32 through the pipe group connecting pipe 16. The liquid hydrogen and the hydrogen gas flowing into the upper pipe group 32 flow to the right in the upper pipe group 32, and flow out of the hydrogen gas outlet pipe 35 on the right side as hydrogen gas.

The helium gas flowing from the helium gas inlet duct 51 to the right side of the upper casing 31 flows to the left in the upper casing 31, and flows into the left side of the lower casing 11 through the helium gas connection duct 52. The helium gas flowing into the lower casing 11 flows in the lower casing 11 to the right and flows out from the right side of the lower casing 11.

As described above, in the lower heat exchanger 10, the liquid hydrogen flows from right to left, and the helium gas flows from left to right. In the upper heat exchanger 30, the liquid hydrogen and the hydrogen gas flow from left to right, and the helium gas flows from right to left. Therefore, the liquid hydrogen vaporizer 100 is an opposed heat exchanger in which the direction of flow of hydrogen and the direction of flow of helium gas are opposite to each other.

Next, the detailed configuration of the lower pipe group 12 will be described referring to 2A and 2B of the drawings. FIG. 2A is a plan view of the lower heat exchanger 10, and FIG. 2B is a cross-sectional view of IIB-IIB shown in FIG. 2A. In 2A shown in the drawing, a broken line indicates a lower fin tube, a U-bend, and a pipe, and a solid line indicates an upper fin tube, a U-bend, and a pipe. Further, an arrow in the drawing indicates a flow direction of the liquid hydrogen, and a white arrow indicates a flow direction of the helium gas. Further, a figure in which a black circle is arranged at the center of a circle in the figure indicates that liquid hydrogen or hydrogen gas in the fin tube flows toward the front side of the paper (from the front to the rear of the vaporizer 100). A figure in which an X mark is placed in a circle in the figure indicates that liquid hydrogen or hydrogen gas in the fin tube flows toward the back side of the paper (from the rear of the vaporizer 100 toward the front).

First, the arrangement of the lower pipe group 12 will be described. The lower pipe group 12 includes a lower first folded flow path block 20A, a lower second folded flow path block 20B, a lower third folded flow path block 20C, and a lower fourth folded flow path block 20D that are connected side by side from right to left. The lower first folded flow path block 20A includes a lower first column tube 21, a lower second column tube 27, an upper first column tube 23, an upper second column tube 25, first and second vertical U bends 22 and 26, and first and second horizontal U bends 24 and 28. The lower first column tube 21, the upper first column tube 23, the lower second column tube 27, and the upper second column tube 25 are straight tube portions formed of straight tube fin tubes extending in the front-rear direction, and are arranged side by side in parallel at a pitch P in the left-right direction. In the drawings 2A and 2B, the sleeves 21B and the fin 21C (see FIGS. 4 and 5) are not shown.

The lower first column tube 21 and the lower second column tube 27 are straight tube fin tubes extending in the front-rear direction below the lower pipe group 12. The lower first column tube 21 and the lower second column tube 27 are arranged side by side in the pitch 2P in the left-right direction. Further, the upper first column tube 23 and the upper second column tube 25 are fin tubes that are arranged above the lower first column tube 21 and the lower second column tube 27 and extend in the front-rear direction. The upper first column tube 23 and the upper second column tube 25 are arranged side by side in the pitch 2P in the left-right direction at positions shifted from the lower first column tube 21 and the lower second column tube 27 by the pitch P in the left direction.

The first vertical U-bend 22 is a U-shaped tube that connects the rear end of the lower first column tube 21 and the rear end of the upper first column tube 23 vertically. The second vertical U-bend 26 is a U-shaped tube connecting the rear end of the upper second column tube 25 and the rear end of the lower second column tube 27 vertically. The first lateral U-bend 24 is a U-shaped tube that laterally connects the front end of the upper first column tube 23 and the front end of the upper second column tube 25. The second lateral U-bend 28 is a U-shaped tube laterally connecting the lower second column tube 27 and the lower third column tube 29.

An elbow 14 is connected to a front end side of the lower first column tube 21, and a liquid hydrogen inlet pipe 13 is connected to the elbow 14.

The liquid hydrogen flowing in from the liquid hydrogen inlet pipe 13 flows backward through the lower first column tube 21 and flows into the first vertical U-bend 22 as indicated by an arrow in the drawing. The liquid hydrogen flowing into the first vertical U-bend 22 flows upward in the first vertical U-bend 22 and flows into the upper first column tube 23. The liquid hydrogen flowing into the upper first column tube 23 flows forward through the upper first column tube 23 and flows into the first lateral U-bend 24. The liquid hydrogen flowing into the first lateral U-bend 24 flows so as to be folded back in the lateral direction by the first lateral U-bend 24, and flows into the upper second column tube 25. The liquid hydrogen flowing into the upper second column tube 25 flows rearward and flows into the second vertical U-bend 26. The liquid hydrogen flowing into the second vertical U-bend 26 flows so as to be folded back in the downward direction by the second vertical U-bend 26, and flows into the lower second column tube 27. The liquid hydrogen flowing into the lower second column tube 27 flows forward through the lower second column tube 27 and flows into the second lateral U-bend 28. The liquid hydrogen flowing into the second lateral U bend 28 flows so as to be folded back in the lateral direction by the second lateral U bend 28, and flows into the lower third column tube 29.

As described above, the first vertical U-bend 22 constitutes an upward turn-up portion that turns up the flow of the liquid hydrogen in the upward direction. In addition, the second vertical U-bend 26 constitutes a downward folding portion that folds back the flow of the liquid hydrogen in the downward direction. The first lateral U-bend 24 and the second lateral U-bend 28 constitute a first lateral turn-back portion and a second lateral turn-back portion that turn back the flow of the liquid hydrogen in the lateral direction.

As described above, the lower first folded flow path block 20A is a folded flow path in which the first vertical U bend 22, the first horizontal U bend 24, the second vertical U bend 26, and the second horizontal U bend 28 are connected to each other with the upper first column tube 23, the upper second column tube 25, and the lower second column tube 27 interposed therebetween, and the lower first column tube 21 is connected to the lower side of the first vertical U bend 22.

The lower second folded flow path block 20B to the lower fourth folded flow path block 20D have the same configuration as the lower first folded flow path block 20A. The lower left straight pipe portions of the lower first to lower third folded flow path blocks 20A~20C and the lower right straight pipe portions of the lower second to lower fourth folded flow path blocks 20B~20D are connected by lateral U-bends, respectively. Thus, the lower first folded flow path block 20A to the lower fourth folded flow path block 20D constitute the lower pipe group 12 formed by a single folded flow path.

An elbow 15 is connected to a lower left straight pipe of the lower fourth folded flow path block 20D, and a pipe group connecting pipe 16 is connected to the elbow 15. The pipe group connecting pipe 16 is connected to the upper pipe group 32.

Next, the configuration of the upper pipe group 32 will be described referring to the drawing 3A and the drawing 3B. Parts similar to the configuration of the lower pipe group 12 described above will be briefly described. Similar to the FIGS. 2A and 2B, the FIG. 3A is a plan view of the upper heat exchanger 30, and the FIG. 3B is a cross-sectional view of IIIB-IIIB shown in the FIG. 3A. In 3A shown in the drawing, a broken line indicates a lower fin tube, a U-bend, and a pipe, and a solid line indicates an upper fin tube, a U-bend, and a pipe. Further, in the drawing, an arrow indicates a flow direction of a two-layer flow of the liquid hydrogen and the hydrogen gas, and a white arrow indicates a flow direction of the helium gas.

The upper pipe group 32 is composed of an upper first folded flow path block 40A, an upper second folded flow path block 40B, an upper third folded flow path block 40C, and an upper fourth folded flow path block 40D which are connected side by side from left to right. The upper first folded flow path block 40A includes an upper first column tube 41, an upper second column tube 47, a lower first column tube 43, a lower second column tube 45, first and second vertical U bends 42 and 46, and first and second horizontal U bends 44 and 48. The upper first column tube 41, the lower first column tube 43, the upper second column tube 47, and the lower second column tube 45 are straight tube portions constituted by fin tubes of straight tubes extending in the front-rear direction, and are arranged side by side in parallel at a pitch P in the left-right direction.

The first vertical U-bend 42 vertically connects the upper first column tube 41 and the lower first column tube 43, and constitutes a downward folded portion. The second vertical U-bend 46 vertically connects the lower second column tube 45 and the upper second column tube 47, and constitutes an upward folded portion. The first lateral U-bend 44 laterally connects the lower first column tube 43 and the lower second column tube 45, and constitutes a first lateral folded portion. The second lateral U-bend 48 laterally connects the upper second column tube 47 and the upper third column tube 49 to form a second lateral turn-up portion.

As described above, the upper first folded flow path block 40A is a folded flow path in which the first vertical U bend 42, the first horizontal U bend 44, the second vertical U bend 26, and the second horizontal U bend 28 are connected to each other with the lower first column tube 43, the lower second column tube 45, and the upper second column tube 47 interposed therebetween, and the upper first column tube 41 is connected to the upper side of the first vertical U bend 42.

The upper second folded flow path block 40B to the upper fourth folded flow path block 40D have the same configuration as the upper first folded flow path block 40A. The upper right straight pipe portions of the upper first to upper third folded flow path blocks 40A~40C and the upper left straight pipe portions of the upper second to upper fourth folded flow path blocks 40B~40D are connected to each other by a lateral U-bend. Thus, the upper first folded flow path block 40A to the upper fourth folded flow path block 40D constitute the upper pipe group 32 constituted by a single folded flow path.

The lower pipe group 12 and the upper pipe group 32 are connected by a single pipe group connecting pipe 16. Therefore, the lower pipe group 12 and the upper pipe group 32 are entirely constituted by a single folded flow path. Therefore, it is not necessary to provide a header, and the configuration can be simplified and compact.

Next, the configuration of the fin tube will be described with reference to FIGS. 4 and 5. As shown in FIG. 4, the lower first column tube 21, which is a fin tube, is composed of a tube 21A and a fin assembly 21D. The fin assembly 21D comprises a sleeve 21B and a fin 21C attached to the sleeve 21B. The cylindrical tubular 21A has liquid-liquid hydrogen or hydrogen gases flowing therein. The tube 21A is made of a hydrogen-resistant material such as stainless-steel. The sleeve 21B is a cylindrical member that is placed on the outer circumferential surface of the cylindrical tube 21A. The sleeve 21B is fitted on the outer circumference of the tube 21A so as to be longitudinally movable with respect to the tube 21A. The fin 21C is formed of strip-shaped plates. The fin 21C are attached to the outer peripheral surface of the sleeve 21B such that a longitudinal direction thereof extends radially from the outer peripheral surface of the sleeve 21B and a widthwise direction thereof is a direction in which the sleeve 21B extends. The plurality of fin 21C is arranged in a line with a gap S along the sleeve 21B. The sleeve 21B and the fin 21C are made of a material whose thermal conductivity is higher than the thermal conductivity of the material constituting the tube 21A. When the tube 21A is made of stainless steel, the sleeve 21B and the fin 21C may be made of, for example, aluminum having a higher thermal conductivity than stainless steel.

Here, referring to FIG. 5, a detailed configuration of the lower first folded flow path block 20A will be described. As shown in FIG. 5, the fin 21C of the lower first column tube 21 in the lower first folded flow path block 20A extends in the radial direction in four directions, i.e., the upward direction, the downward direction, the obliquely upward direction, and the obliquely downward direction. Similar to the lower first column tube 21, the lower second column tube 27, the upper first column tube 23, and the upper second column tube 25 are each composed of a tube 27A, 23A, 25A and a fin assembly 27D, 23D, 25D. Each of the fin assemblies 27D, 23D, 25D includes a sleeve 23B, 25B, 28B and a fin 27C, 23C, 25C. Each fin 27C, 23C, 25C is attached to each sleeve 23B, 25B, 27B so as to extend radially toward each of the four directions. As indicated by the open arrows in FIG. 5, the helium gas flows through the gaps S (see FIG. 4) between the fin 21C, 23C, 25C, 27C of the strip-shaped plates arranged in a row in the longitudinal direction and exchanges heat with the liquid-hydrogen flowing in the tube 21A, 23A, 25A, 27A. Since the helium gas flows through the gap S as turbulence and flows through the fin 21C, 23C, 25C, 27C, the heat-transfer coefficient between the fin 21C, 23C, 25C, 27C and the helium gas increases. This improves the heat exchange efficiency between the liquid hydrogen and the helium gas.

The lower end 21E of the lower fin 21C of the lower first column tube 21 and the lower end 27E of the lower fin 27C of the lower second column tube 27 are in contact with the inner surface 11A of the lower casing 11. As a result, the lower first folded flow path block 20A is supported by the fin 21C from the inner surface 11A of the lower casing 11.

The detailed configuration of the fin tubes included in the lower second folded flow path block 20B to the lower fourth folded flow path block 20D and the arrangement of the fins are the same as the configuration of the lower first folded flow path block 20A. The lower ends of the fins of the fin tubes disposed below the lower second folded flow path block 20B to the lower fourth folded flow path block 20D are in contact with the inner surface 11A of the lower casing 11. Thus, the lower second folded flow path block 20B to the lower fourth folded flow path block 20D are supported from the inner surface 11A of the lower casing 11 by the fins of the fin tube.

Further, the detailed configuration of the fin tubes included in the upper first folded flow path block 40A to the upper fourth folded flow path block 40D and the arrangement of the fins are also the same as the configuration of the lower first folded flow path block 20A described above. The lower ends of the fin tubes disposed below the upper first folded flow path block 40A to the upper fourth folded flow path block 40D are in contact with the inner surface 31A of the upper casing 31 (see 3A and 3B in the drawings). Thus, the upper first folded flow path block 40A to the upper fourth folded flow path block 40D are supported from the inner surface 31A of the upper casing 31 by the fins of the fin tube.

Figure 6:
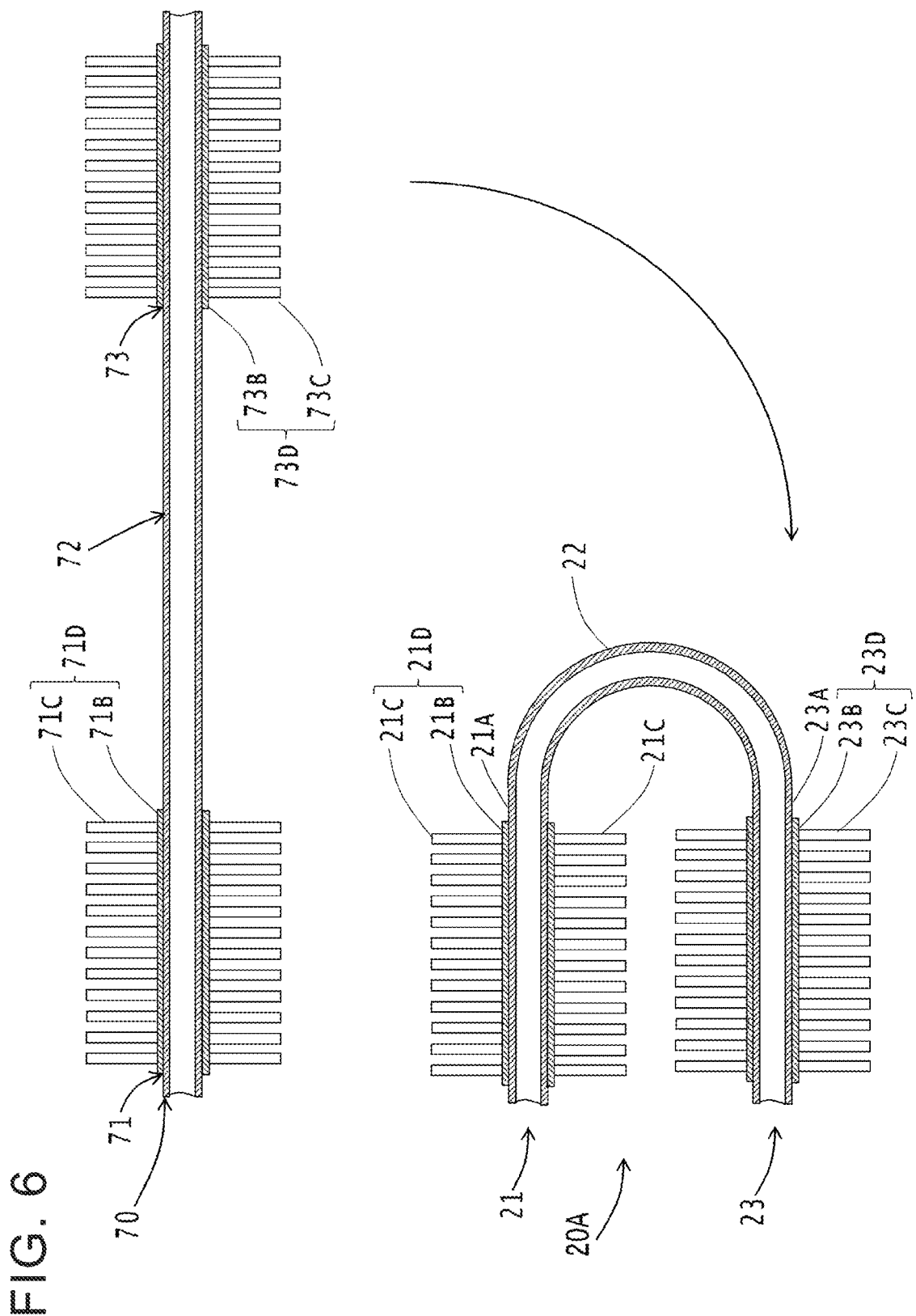
FIG. 6 is an explanatory diagram illustrating a method of manufacturing a folded flow path.

Next, with reference to FIG. 6, an example of a method of manufacturing the folded flow path in which the fin tube and the U-bend are connected will be briefly described. In the following, a manufacturing process of a part of the lower first folded flow path block 20A will be described. As shown in the upper drawing of FIG. 6, a long straight tube 70 made of stainless steel or the like is prepared. Also, a fin assembly 71D in which the fin 71C is attached to the sleeve 71B and a fin assembly 73D in which the fin 73C is attached to the sleeve 73B are provided. The lengths of the fin assembly 71D, 73D are substantially the same as the lengths of the lower first column tube 21 and the upper first column tube 23.

Next, the fin assembly 71D is fitted to the outer periphery of the fin tube component 71 of the tube 70. Similarly, the fin assembly 73D is fitted to the outer periphery of the fin tube component 73 of the tube 70.

The U-bend component 72 between the fin tube components 71 and 73 is bent into a U-shape. Then, the fin tube component 71 becomes the lower first column tube 21 composed of the tube 21A and the fin assembly 21D. Further, the fin tube component 73 is formed of the tube 23A and the fin assembly 23D and is the first column tube 23. Then, the U-bend component 72 becomes the first vertical U-bend 22. According to this manufacturing method, the folded flow path can be formed by a simple method without welding the tube and the U-bend.

Incidentally, not limited to the manufacturing method as described above, the fin tube constituting the lower first column tube 21 and the fin tube constituting the upper first column tube 23, and the first vertical U bend 22 separately manufactured, it may be connected by welding or the like.

In the above-described liquid hydrogen vaporizer 100, since the sleeve 21B slides with respect to the tube 21A, it is possible to absorb a difference in thermal expansion between the sleeve 21B and the tube 21A and suppress thermal stresses generated in the tube 21A or the sleeve 21B.

Accordingly, the liquid hydrogen vaporizer 100 can increase the heat transfer area by the fin 21C even when there is a thermal difference between the tube 21A through which the cryogenic liquid hydrogen flows and the sleeve 21B or the fin 21C in contact with the helium gas. This makes it possible to make the liquid hydrogen vaporizer 100 compact enough to be mounted on a vehicle.

In addition, the liquid hydrogen vaporizer 100 is configured such that the sleeve 21B and the fin 21C are made of aluminum or the like having a higher thermal conductivity than the stainless steel constituting the tube 21A. As a result, the liquid hydrogen vaporizer 100 can be made more compact.

Further, in the liquid hydrogen vaporizer 100, since the entire lower pipe group 12 and the upper pipe group 32 is constituted by a single folded flow path, there is no need to provide a header, the configuration is simplified, and it is possible to make it compact.

In the liquid hydrogen vaporizer 100, the fin 27C, 23C, 25C are attached to the sleeve 23B, 25B, 27B so as to extend radially toward four directions. As a result, the fin 21C, 23C, 25C, 27C of the plurality of strip-shaped plates can be densely arranged, and thus the configuration can be compact. Further, the heat transfer coefficient between the fin 21C, 23C, 25C, 27C and the helium gas increases due to the turbulent flow generated when the helium gas passes through the gap S (see FIG. 4) of each fin 21C, 23C, 25C, 27C, and the heat transfer efficiency between the liquid-hydrogen and the helium gas can be improved. As a result, the liquid hydrogen vaporizer 100 can be made compact.

Further, the lower first folded flow path block 20A to the lower fourth folded flow path block 20D of the liquid hydrogen vaporizer 100 are supported from the inner surface 11A of the lower casing 11 by fins of fin tubes. Similarly, the upper first folded flow path block 40A to the upper fourth folded flow path block 40D are supported from the inner surface 31A of the upper casing 31 by fins of the fin tube. As a result, it is not necessary to support each tube in which the cryogenic liquid hydrogen flows inside and the temperature of the outer surface becomes cryogenic, and the structure can be simplified.

Further, since the liquid hydrogen vaporizer 100 uses a helium gas that maintains a gas state without freezing even if it comes into contact with the outer surface of the tube close to the temperature of the liquid hydrogen as the heating medium, it is possible to prevent the performance of the liquid hydrogen vaporizer 100 from deteriorating due to the freezing of moisture on the surface of the tube as in the case where air or the like is used as the heating medium.

What is claimed is:

1. A liquid hydrogen vaporizer that performs heat exchange between liquid hydrogen and a heating medium and that vaporizes liquid hydrogen, the liquid hydrogen vaporizer comprising:
   a fin tube that is configured of a tube through which liquid hydrogen flows and a fin assembly that is attached to an outer periphery of the tube; and
   a casing in which the heating medium flows on an outer side of the fin tube accommodated inside the casing,
   wherein the fin assembly is configured of
   a sleeve that is mounted on an outer surface of the tube, and
   a plurality of fins attached to an outer peripheral surface of the sleeve, and
   wherein the sleeve is slidable in a longitudinal direction of the tube,
   wherein the tube is configured of a single folded flow path in which an upper folded portion, a first lateral folded portion, a lower folded portion, and a second lateral folded portion are repeated in order with a straight pipe portion interposed between the upper folded portion, the first lateral folded portion, the lower folded portion, and the second lateral folded portion,
   wherein the fin assembly is provided in the straight pipe portion,
   wherein each of the fins is a plurality of strip-shaped plates in which a longitudinal direction extends in a radial direction from the outer peripheral surface of the sleeve, and each of the fins is attached to the sleeve such that a width direction is an extending direction of the sleeve,
   wherein the plurality of fins is arranged in a line with a gap along the extending direction of the sleeve.

2. The liquid hydrogen vaporizer according to claim 1, wherein the sleeve and the fin are made of a different material than the tube.

3. The liquid hydrogen vaporizer according to claim 1, wherein in the fin tube, a tip of the fin is in contact with an inner surface of the casing, and the fin tube is supported by the fin from the inner surface of the casing.

4. The liquid hydrogen vaporizer according to claim 1, wherein the heating medium is helium gas.

* * * * *